United States Patent
Philpott et al.

(10) Patent No.: US 10,487,892 B2
(45) Date of Patent: Nov. 26, 2019

(54) BRAKE CALIPER HOUSING METHOD OF MANUFACTURE

(71) Applicant: ArvinMeritor Technology, LLC, Troy, MI (US)

(72) Inventors: Daniel Philpott, Goodrich, MI (US); Soumar Jabbour, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 70 days.

(21) Appl. No.: 15/910,161

(22) Filed: Mar. 2, 2018

(65) Prior Publication Data

US 2019/0271368 A1 Sep. 5, 2019

(51) Int. Cl.
| | | |
|---|---|---|
| F16D 65/00 | (2006.01) | |
| B22D 25/02 | (2006.01) | |
| B23P 13/02 | (2006.01) | |
| B23P 17/02 | (2006.01) | |
| B23P 25/00 | (2006.01) | |
| F16D 55/22 | (2006.01) | |
| B23B 35/00 | (2006.01) | |
| F16D 55/00 | (2006.01) | |

(52) U.S. Cl.
CPC ......... *F16D 65/0075* (2013.01); *B22D 25/02* (2013.01); *B23B 35/00* (2013.01); *B23P 13/02* (2013.01); *B23P 17/02* (2013.01); *B23P 25/00* (2013.01); *F16D 55/22* (2013.01); *F16D 65/0068* (2013.01); *F16D 2055/002* (2013.01); *F16D 2250/003* (2013.01); *F16D 2250/0007* (2013.01); *F16D 2250/0015* (2013.01); *Y10T 29/49988* (2015.01); *Y10T 29/49989* (2015.01); *Y10T 29/49995* (2015.01); *Y10T 29/49996* (2015.01)

(58) Field of Classification Search
CPC ......... Y10T 29/49995; Y10T 29/49996; Y10T 29/49988; Y10T 29/49989; F16D 65/0075; F16D 65/0068; F16D 2250/0007; F16D 2250/0015; B22D 25/02; B23P 13/02; B23P 17/02; B23P 25/00

See application file for complete search history.

(56) References Cited

U.S. PATENT DOCUMENTS

| | | |
|---|---|---|
| 8,857,575 B2 | 10/2014 | Philpott |
| 9,068,610 B2 | 6/2015 | Philpott |
| 2005/0061466 A1 | 3/2005 | Morais et al. |
| 2017/0023082 A1 | 1/2017 | Morris et al. |
| 2017/0082160 A1 | 3/2017 | Philpott et al. |

FOREIGN PATENT DOCUMENTS

| | | |
|---|---|---|
| DE | 10106591 C1 | 8/2002 |
| KR | 101021955 B1 | 3/2011 |

OTHER PUBLICATIONS

European Patent Office, Extended European Search Report for corresponding European Application No. 19152723.3-1108, dated Mar. 14, 2019.

*Primary Examiner* — Jermie E Cozart
(74) *Attorney, Agent, or Firm* — Brooks Kushman P.C.

(57) ABSTRACT

A method of making a brake caliper housing includes providing a first die and a second die that cooperate to define a cavity when disposed against each other along a mating plane. The method further includes introducing molten material into the cavity to cast the brake caliper housing. One or more surfaces of the brake caliper housing may be machined.

20 Claims, 5 Drawing Sheets

BRAKE CALIPER HOUSING METHOD OF MANUFACTURE

TECHNICAL FIELD

This disclosure relates to a brake caliper housing and a method of manufacture.

BACKGROUND

A brake caliper housing is disclosed in U.S. Patent Publication No. 2017/0023082.

SUMMARY

In at least one approach, a method of making a brake caliper housing is provided. The method may include providing a first die and a second die that cooperate to define a cavity when disposed against each other along a mating plane. The method may further include introducing molten material into the cavity to cast the brake caliper housing. The brake caliper housing may include an actuator mounting flange adapted for mounting a brake caliper actuator. The actuator mounting flange may be at least partially disposed in the first die. The actuator mounting flange may include a first surface, a first mounting boss, a second mounting boss, and an actuator snout. The first mounting boss may have a first boss surface disposed opposite the first surface. The second mounting boss may have a second boss surface disposed opposite the first surface. The actuator snout that may be disposed between the first mounting boss and the second mounting boss and may extend away from the first surface. The first boss surface and the second boss surface may be disposed perpendicular to the mating plane.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
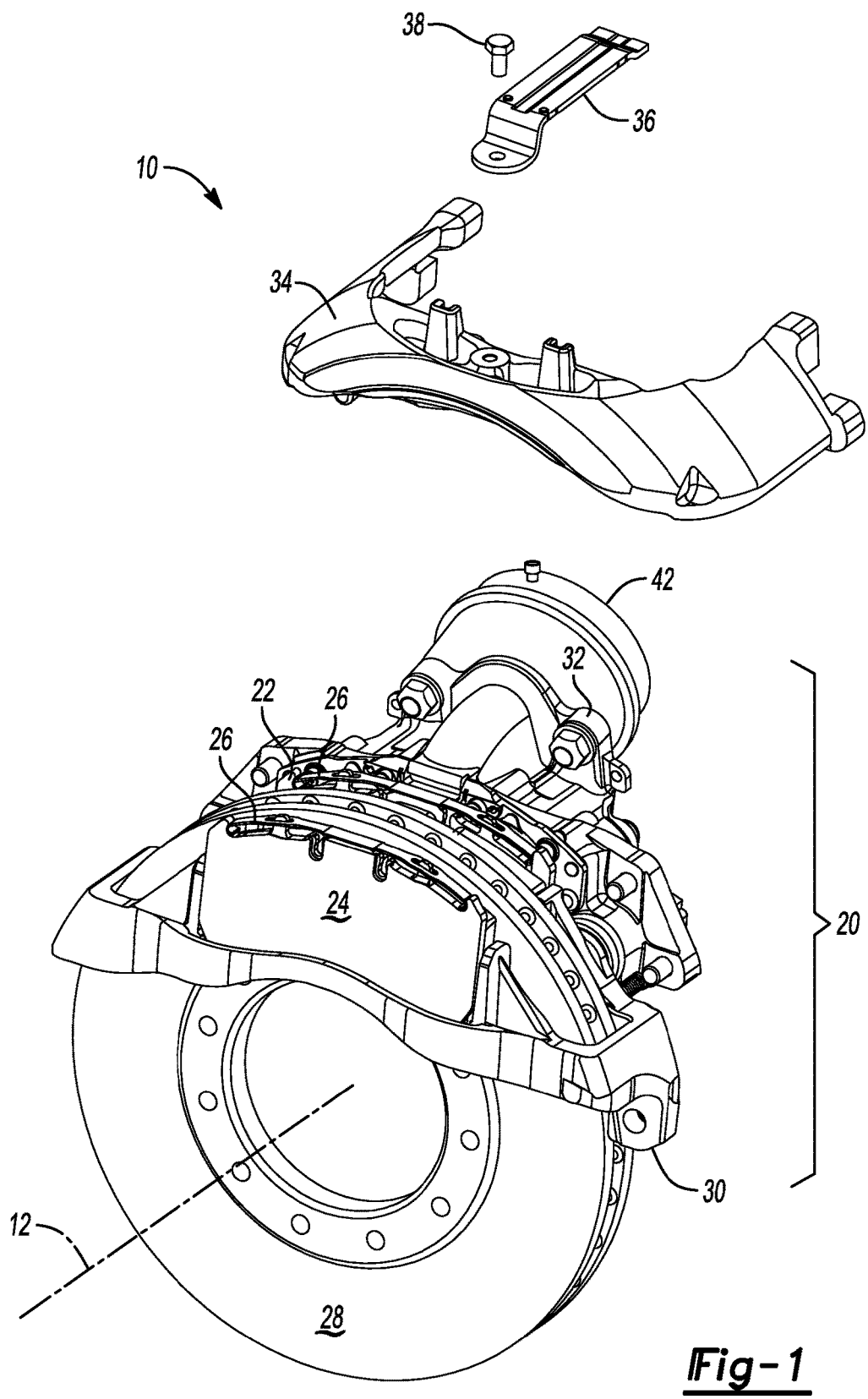
FIG. 1 is a partially exploded view of a brake assembly.

Referring to FIG. 1, a brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In at least one approach, the brake assembly 10 may include a housing assembly 20, a first brake pad assembly 22, a second brake pad assembly 24, and at least one brake pad spring 26. In still another approach, the brake assembly 10 may include a pad shield in place of, or in addition to, the brake pad spring 26.

The housing assembly 20 may receive various components of the brake assembly 10. In addition, the housing assembly 20 may facilitate positioning of the first brake pad assembly 22 and the second brake pad assembly 24 with respect to a rotor 28, also known as a brake disc, to facilitate braking of the vehicle. The rotor 28 may define a central axis 12 extending therethrough.

In at least one approach, the housing assembly 20 may include a brake carrier 30, a brake caliper housing (referred to herein as a caliper housing 32), and a caliper bridge 34. The brake carrier 30 may be fixedly mounted to the vehicle. For example, the brake carrier 30 may be connected to an axle assembly or a steering knuckle, such as with an intermediate component like a torque plate in one or more embodiments. The brake carrier 30 may receive and/or support the first brake pad assembly 22 and the second brake pad assembly 24, and may include a rotor opening that may be configured to receive the rotor 28. As such, the brake carrier 30 may straddle the rotor 28 and help position the first brake pad assembly 22 and the second brake pad assembly 24 on opposite sides of the rotor 28.

The housing assembly 20 may further include a retainer bracket 36. The retainer bracket 36 may have a first end that may engage or may be received in a notch in the caliper housing 32 and a second end that may be fixedly disposed on the caliper bridge 34. For example, the second end may receive a fastener 38, such as a bolt, that may couple the retainer bracket 36 to the caliper bridge 34.

The caliper housing 32 may be moveably disposed on the brake carrier 30. For example, the caliper housing 32 may be slidably disposed on a pair of guide pins 40 that may be fixedly disposed on the brake carrier 30. The caliper housing 32 may be associated with or may receive at least one actuator 42 that may actuate the first brake pad assembly 22 and the second brake pad assembly 24 into engagement with the rotor 28. More specifically, the actuator 42 may actuate the first brake pad assembly 22 into engagement with the rotor 28 and then move the caliper housing 32 and bridge 34 to actuate the second brake pad assembly 24 toward the rotor 28. The actuator 42 may have any suitable configuration. For instance, the actuator may include a piston assembly that may be pneumatically, hydraulically, mechanically, electrically, or electromechanically actuated in one or more embodiments. The piston assembly may move along an axis toward or away from the rotor 28 such that the piston assembly may exert force against a back side of the first brake pad assembly 22.

Figure 2:
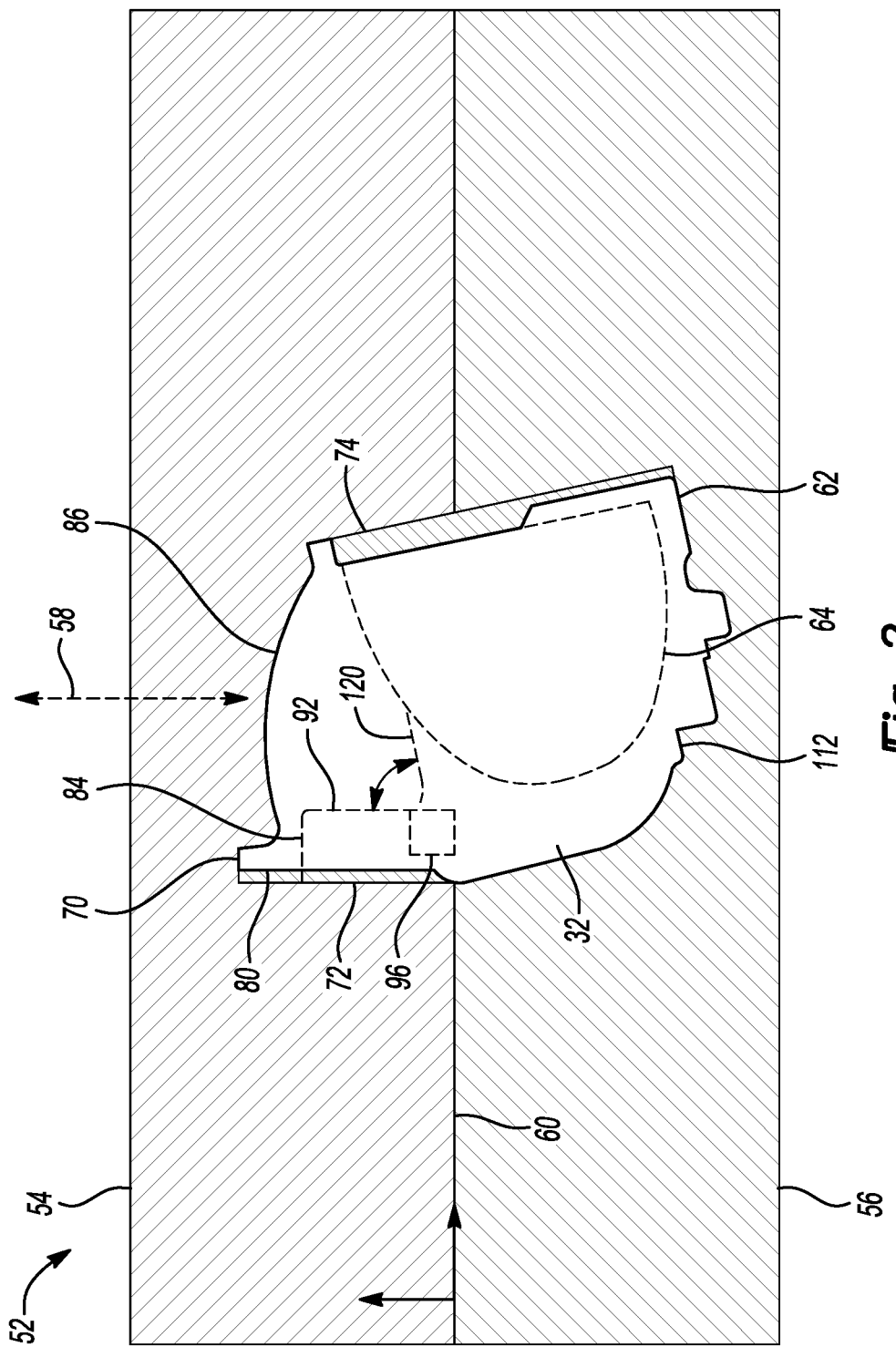
FIG. 2 is a cross-sectional view of a die assembly for casting a brake caliper housing.
Figure 3:
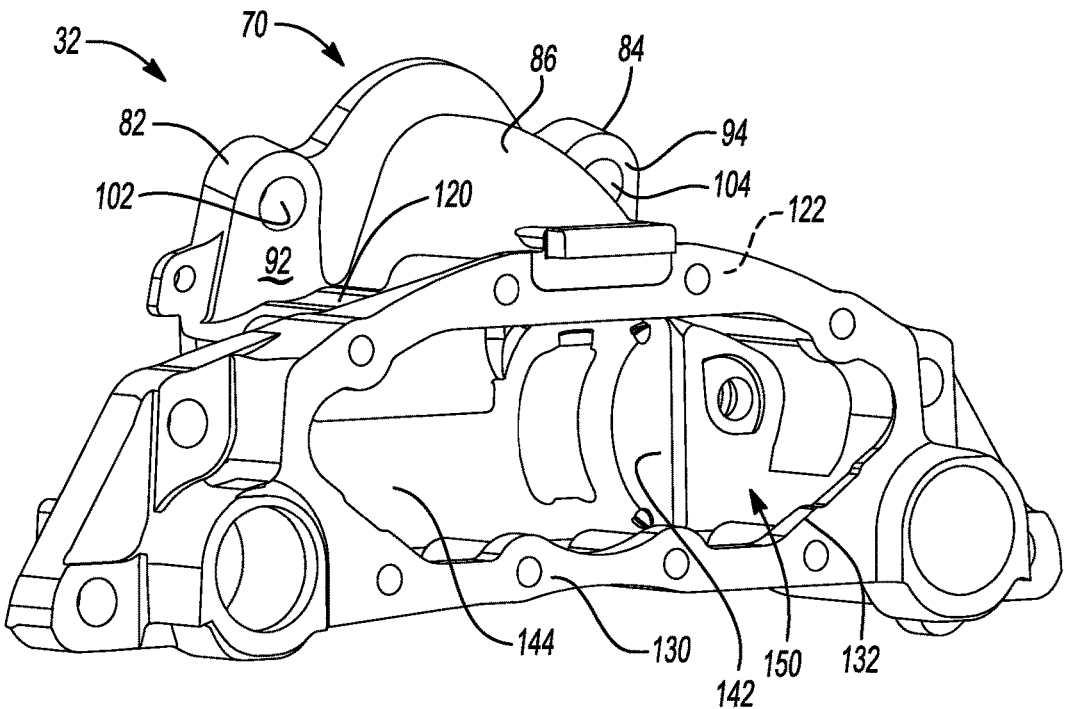
FIG. 3 is a front perspective view of the brake caliper housing.

Referring to FIG. 2, the caliper housing may be formed from a unitary ("one-piece") cast caliper housing 32. The cast caliper housing 32 may be formed in a casting assembly 52. The casting assembly 52 may include a first die 54 and a second die 56. At least one of the first die 54 and the second die 56 may be moveable along an axis 58, which may be disposed perpendicular to a mating plane 60. The first die 54 and the second die 56 may cooperate to define a cavity 62 when disposed against each other along the mating plane 60. The mating plane 60 may extend generally perpendicular to the axis 58. In the closed configuration, the first die 54 may engage the second die 56 continuously around the cavity 62 in the mating plane 60. To cast the caliper housing 32, molten material may be introduced into the cavity 62. One or more inserts and/or cores 64 may be provided in the cavity 62 to form an interior of the cast caliper housing 32.

Upon casting, the caliper housing 32 may be removed from the first and second dies 54, 56. One or more surfaces (e.g., surfaces 72, 74) may be altered (e.g., machined) such that material is removed from the cast caliper housing 32. For example, and as discussed in greater detail, material may be removed from a surface 72 but not from a boss surface disposed opposite the surface 72 so as to reduce a thickness of a mounting boss.

Referring to FIGS. 3-6, the caliper housing 32 may include an actuator mounting flange 70. The actuator mounting flange 70 may be adapted such that a brake caliper actuator (e.g., actuator 42 of FIG. 1) may be mounted to the caliper housing 32. The actuator mounting flange 70 may include a first surface 80.

The actuator mounting flange 70 may also include a first mounting boss 82, a second mounting boss 84, and an actuator snout 86 disposed between the first mounting boss 82 and the second mounting boss 84. The actuator snout 86 may extend from the first surface 80. The first mounting boss 82 may have a first boss surface 92 disposed opposite the first surface 80. The second mounting boss 84 may have a second boss surface 94 that may also be disposed opposite the first surface 80. In at least one approach, the first and second boss surfaces 92, 94 are coplanar.

The first mounting boss 82 may define a first aperture 102. The first aperture 102 may extend from the first surface 80 to the first boss surface 92 such that the first aperture 102 may be referred to as a first through hole. The second mounting boss 84 may similarly define a second aperture 104. The second aperture 104 may extend from the first surface 80 to the second boss surface 94 such that the second aperture may be referred to as a second through hole. The first and second apertures 102, 104 may be formed by drilling the first and second mounting bosses 82, 84, respectively. In still another approach, the first and second apertures 102, 104 may be formed during the casting process (e.g., using inserts, cores, or other suitable approaches).

Referring again momentarily to FIG. 2, during casting of the caliper housing 32, the actuator mounting flange 70 may be disposed at least partially in the first die 54. In at least one approach, the actuator mounting flange 70 may be disposed completely in the first die 54. The first boss surface 92 and the second boss surface 94 may be disposed perpendicular to the mating plane 60, as indicated at 96.

The caliper housing 32 may have a top surface 120 that may face away from the cavity 62. The caliper housing 32 may also have a bottom surface 112 that is disposed opposite the top surface 120 and that also faces away from the cavity 62. In at least on approach, the top surface 120 and the bottom surface 112 may be disposed in a nonparallel and non-perpendicular relationship with the mating plane 60 and the axis 58.

As discussed, upon removing the caliper housing 32 from the casting assembly 52, material may be removed from one or more surfaces. In at least one approach, a method of making a caliper housing 32 may include removing material 72 from the caliper housing 32 to form the first surface 80. Removing material from the first surface 80 may reduce a thickness of at least a portion of the actuator mounting flange 70. In one example, at the first mounting boss 82, material may be removed from the first surface 80 but not from the first boss surface 92. In this way, a thickness of the first mounting boss 82 may be reduced. Similarly, at the second mounting boss 84, material may be removed from the first surface 80 but not from the second boss surface 94. In this way, a thickness of the second mounting boss 84 may be reduced.

Removing material from the first surface 80 may also include making the first surface 80 a substantially planar surface. For example, the first surface 80 may be machined such that it is parallel with the first boss surface 92, the second boss surface 94, or both the first and second boss surfaces 92, 94.

As such, one or both of the first and second mounting bosses 82, 84 may be provided with a machined surface at the first surface 80, and an unmachined surface (e.g., first boss surface 92 and second boss surface 94, respectively). An unmachined surface may be a surface that is formed during a casting process (e.g., a sand casting process). A machined surface may be a surface that has become exposed, for example, due to a machining process performed after the casting process. The machining process may be any process that alters a surface dimension or surface finish. Example machine processes may include such as boring, broaching, drilling, electrical discharge machining, electrochemical machining, electron beam machining, milling, photochemical machining, planing, reaming, sawing, shaping, tapping, turning, and ultrasonic machining.

The different surface finishes may be expressed as having different surface roughness values. An unmachined surface may have a surface roughness value greater than 10 micrometers. For example, an unmachined surface may have a surface roughness value in the range of approximately 12 micrometers to approximately 25 micrometers. A machined surface may have a surface roughness value less than or equal to 10 micrometers. For example, a machined surface may have a surface roughness value in the range of approximately 5 micrometers to approximately 7 micrometers.

Figure 5:
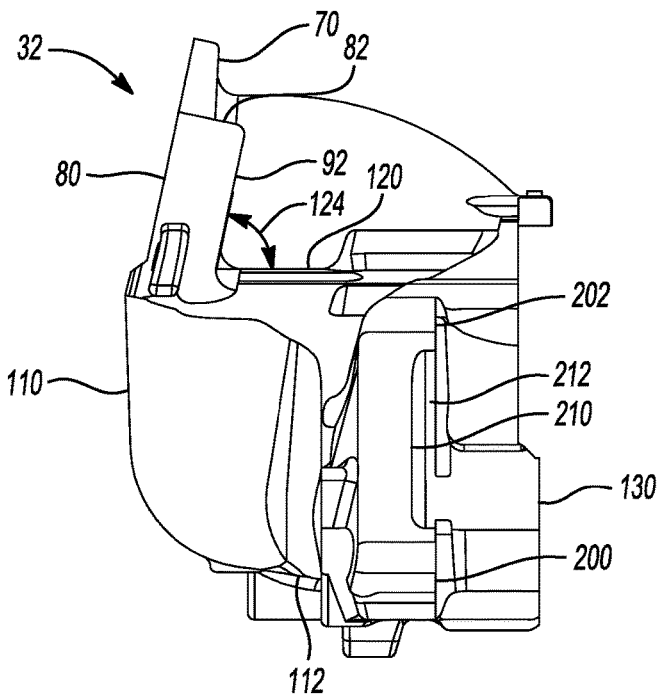
FIG. 5 is a side elevation view of the brake caliper housing.

As shown in FIG. 5, the caliper housing 32 may include a rear surface 110. The rear surface 110 may extend from the first surface 80 to a lower surface 112 of the caliper housing 32. In at least one approach, the rear surface 110 may be disposed in a nonparallel relationship with the first surface 80. The rear surface 110 may be disposed perpendicular, or substantially perpendicular (e.g., within +/−5°), to the rear surface 112.

Figure 4:
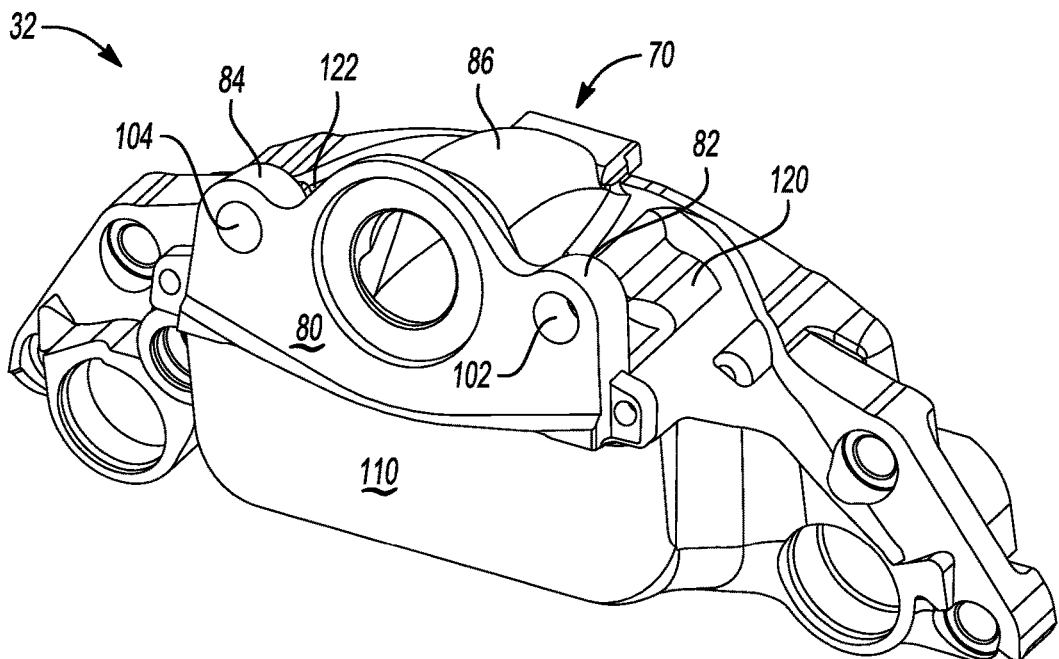
FIG. 4 is a rear perspective view of the brake caliper housing.

The caliper housing 32 may include a first upper surface 120, and may include a second upper surface 122. The first and second upper surfaces 120, 122 may be disposed opposite the lower surface 112. As shown in FIG. 5, the first upper surface 120 may be disposed at an acute angle with the first mounting boss 82, as indicated at 124. Similarly, the second upper surface 122 may be disposed at an acute angle with the second mounting boss 84. As shown in FIG. 4, the actuator snout 86 may be disposed between the first and second upper surfaces 120, 122.

The caliper housing 32 may further include an interface wall 130. The interface wall 130 may be disposed opposite the rear surface 110 and may be disposed in a parallel, or substantially parallel (e.g., within +/−5°), relationship with the rear surface 110. In at least on approach, the interface wall 130 may be disposed in a nonparallel relationship with the first boss surface 92, the second boss surface 94, or both the first and the second boss surfaces 92, 94. The interface wall 130 may define an opening 132 that may permit one or more internal components (e.g., pistons) disposed within the caliper housing 32 to interact with one or more brake pad assemblies.

Figure 6:
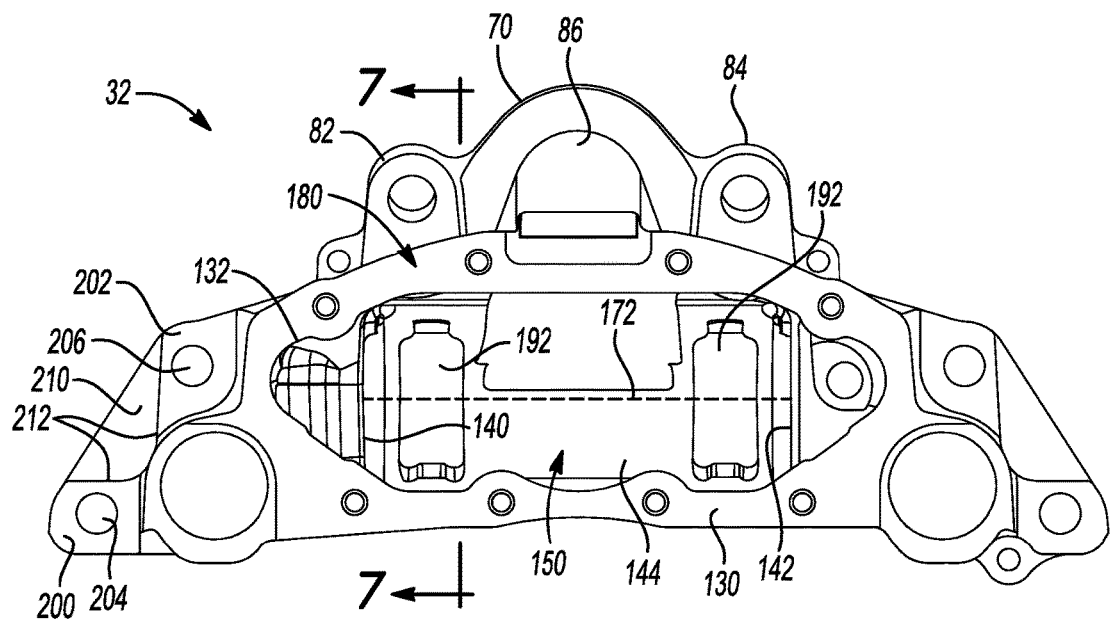
FIG. 6 is a front elevation view of the brake caliper housing.

As shown in FIG. 6, the caliper housing 32 may include a first end wall 140, a second end wall 142 that may be disposed opposite the first end wall 140, and a transverse wall 144 that extends from the first end wall 140 to the second end wall 142. In at least one approach, the second end wall 142 may extend at least partially in a plane that is parallel to the first end wall 140. The first and second walls 140, 142 may extend orthogonally from the transverse wall 144.

The interface wall 130 may extend from the first end wall 140, the second end wall 142, and the transverse wall 144. The interfacing wall 130 may cooperate with the first end wall 140, the second end wall 142, and the transverse wall 144 to at least partially define a cavity 150. The interface wall 130 may define the opening 132 of the cavity 150.

Figure 7:
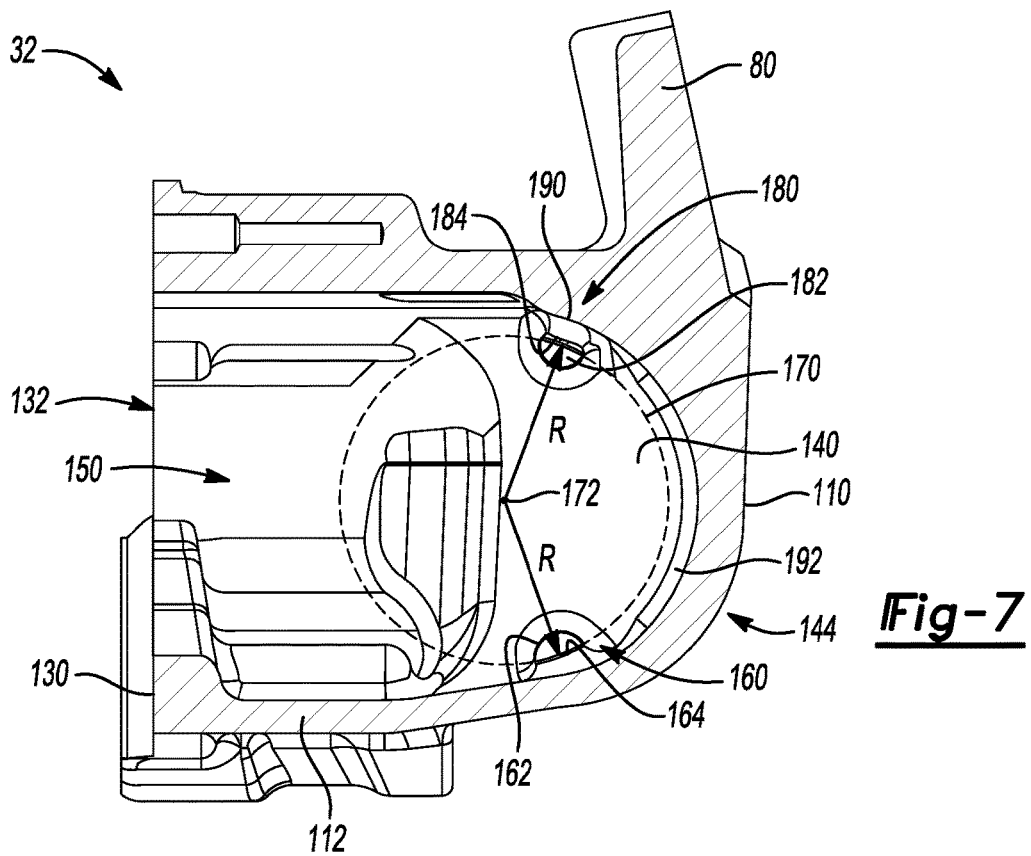
FIG. 7 is a cross section view of the brake caliper housing.
Figure 8:
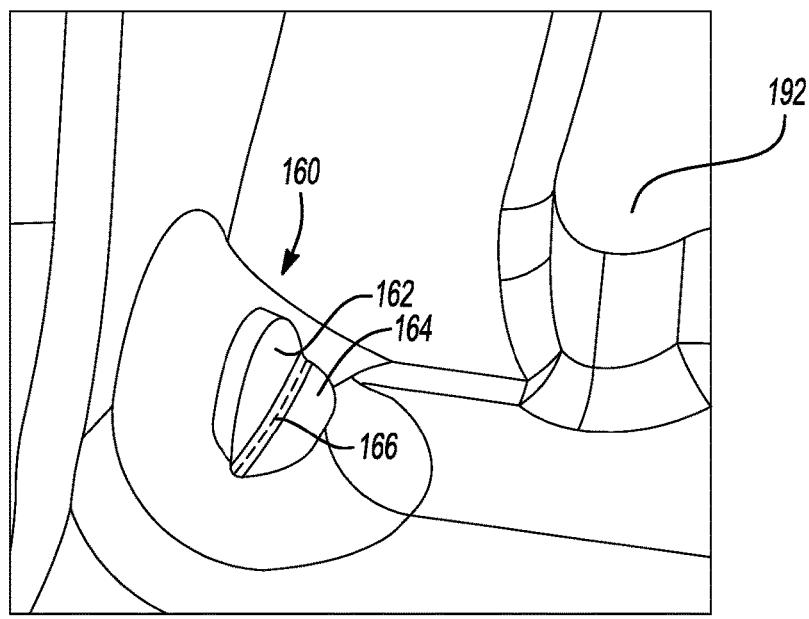
FIG. 8 is an enlarged view of a protrusion formed in a cavity of the brake caliper housing.

Referring now to FIGS. 7 and 8, one or more bearing protrusions may be provided within the cavity 150. For example, a first bearing protrusion 160 may extend from the first end wall 140 and the transverse wall 144. The first bearing protrusion 160 may define a first lateral bearing surface 162 that may be disposed, for example, substantially parallel to the first end wall 140. The first bearing protrusion 160 may further define a first arcuate bearing 164 surface that may extend, for example, from the first lateral bearing surface 162. The first lateral bearing surface 162 may intersect the first arcuate bearing surface 164 along a continuously curved line 166, as indicated in FIG. 8.

The first lateral bearing surface 162 and the first arcuate bearing surface 164 of the first bearing protrusion 160 may be adapted to rotatably support an operating shaft 170, indicated schematically in FIG. 7.

In at least one approach, the first lateral bearing surface 162 may be spaced apart from the first end wall 140. The first arcuate bearing surface 164 may be spaced apart from the transverse wall 144. In this way, support surfaces of the first lateral bearing surface 162 and the first arcuate bearing surface 164 may be offset from the first end wall 140 and the transverse wall 144, respectively.

Referring momentarily to FIG. 6, a transverse axis 172 may intersect the first end wall 140 and the second end wall 142. The transverse axis 172 may be parallel to a central axis of the operating shaft 170. In still another approach, the transverse axis 172 may be coaxial with the central axis of the operating shaft 170.

Referring again to FIG. 7, the first arcuate bearing surface 164 may be radially disposed with respect to the transverse axis 172. The first lateral bearing surface 162 may be disposed perpendicular to the transverse axis 172. In at least one approach, the first bearing protrusion 160 may be completely disposed below the transverse axis 172.

The caliper housing 32 may further include a second bearing protrusion 180. The second bearing protrusion 180 may extend from the first end wall 140. The second bearing protrusion 180 may be disposed opposite the transverse axis 172 from the first bearing protrusion 160, and may extend toward the first bearing protrusion 160. In at least one approach, the second bearing protrusion 180 may be completely disposed above the transverse axis 172. The second bearing protrusion 180 may define a second lateral bearing surface 182 and a second arcuate bearing surface 184. In a least one approach, the second lateral bearing surface 182 may be spaced apart from the first end wall 140. The second arcuate bearing surface 184 may be spaced apart from the transverse wall 144. The second lateral bearing surface 182 may be disposed substantially parallel to the first end wall 140. The second arcuate bearing surface 184 may extend from the second lateral bearing surface 182. The second lateral bearing surface 182 and the second arcuate bearing surface 184 may be adapted to support the operating shaft 170.

In at least one approach, the caliper housing 32 may further include an upper surface 190. The second bearing protrusion 180 may extend from the upper surface 190 toward the first bearing protrusion 160.

The first lateral bearing surface 162 may be parallel to the second lateral bearing surface 182. For example, the first lateral bearing surface 162 may be coplanar with the second lateral bearing surface 182.

The second arcuate bearing surface 184 may be radially disposed with respect to the transverse axis 172. As such, the first arcuate bearing surface 164 and the second arcuate bearing surface 184 may be disposed a common radial distance R from the transverse axis 172.

In at least one approach, the caliper housing 32 includes at least one saddle bearing protrusion 192. The saddle bearing protrusion 192 may extend from the transverse wall 144. The first bearing protrusion 160 may be axially disposed between the saddle bearing protrusion 192 and the first end wall 140. The second bearing protrusion 180 may also be axially disposed between the saddle bearing protrusion 192 and the first end wall 140.

Referring again to FIGS. 5 and 6, the caliper housing 32 may further include a first mounting pad 200 and a second mounting pad 202. The second mounting pad 202 may be spaced apart from the first mounting pad 200. The first mounting pad 200 and the second mounting pad 202 may extend perpendicular with respect to each other.

One or both of the first and second mounting pads 200, 202 may define a hole 204, 206. The holes 204, 206 may be through holes that may extend through the each of the first mounting pad 200 and the second mounting pad 202, respectively. The holes 204, 206 may be adapted to receive a fastener for mounting a bridge (e.g., bridge 34 of FIG. 1) to the caliper housing 32.

In at least one approach, a connecting surface 210 may extend from the first mounting pad 200 to the second mounting pad 202. For example, a step surface 212 may extend from the connecting surface 210 to the first mounting pad 200 and the second mounting pad 202. In this way, the step surface 212 may define an offset between the connecting surface 210 and the face surfaces of the first and second mounting pads 200, 202. As such, the connecting surface 210 may be spaced apart from the bridge 34; for example, when the bridge 34 is secured to the caliper housing 32 at the face surfaces.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of making a brake caliper housing comprising:
   providing a first die and a second die that cooperate to define a cavity when disposed against each other along a mating plane; and
   introducing molten material into the cavity to cast the brake caliper housing, wherein the brake caliper housing includes an actuator mounting flange adapted for mounting a brake caliper actuator, the actuator mounting flange being at least partially disposed in the first die, the actuator mounting flange including:
   a first surface;
   a first mounting boss having a first boss surface disposed opposite the first surface;
   a second mounting boss having a second boss surface disposed opposite the first surface; and
   an actuator snout that is disposed between the first mounting boss and the second mounting boss and extends away from the first surface, wherein the first boss surface and the second boss surface are disposed perpendicular to the mating plane.

2. The method of claim 1 wherein the actuator mounting flange is completely disposed in the first die.

3. The method of claim 1 wherein the first boss surface is coplanar with the second boss surface.

4. The method of claim 1 further comprising removing the brake caliper housing from the first die and the second die and removing material from the first surface but not the first boss surface to reduce a thickness of the first mounting boss.

5. The method of claim 4 further comprising removing the brake caliper housing from the first die and the second die and removing material from the first surface but not the second boss surface to reduce a thickness of the second mounting boss.

6. The method of claim 5 further comprising drilling a first through hole through the first mounting boss.

7. The method of claim 6 further comprising drilling a second through hole through the second mounting boss.

8. The method of claim 7 further comprising removing material from a front surface that is disposed opposite a rear surface and that defines a main opening, wherein the front surface is disposed in a nonparallel relationship with the first boss surface.

9. The method of claim 8 wherein the front surface is disposed in a nonparallel relationship with the second boss surface.

10. The method of claim 8 wherein the front surface is disposed in a substantially parallel relationship with the rear surface.

11. The method of claim 5 wherein removing material from the first surface includes making the first surface substantially planar.

12. The method of claim 11 wherein the substantially planar first surface is disposed in a parallel relationship with the first boss surface.

13. The method of claim 11 wherein the substantially planar first surface is disposed in a parallel relationship with the second boss surface.

14. The method of claim 11 wherein the brake caliper housing includes a rear surface that extends from the first surface to a lower surface of the brake caliper housing, wherein the first surface is disposed in a nonparallel relationship with the rear surface.

15. The method of claim 14 wherein the lower surface is disposed perpendicular to the rear surface.

16. The method of claim 14 wherein the brake caliper housing includes a first upper surface that is disposed opposite the lower surface, the first upper surface being disposed at an acute angle with respect to the first boss surface.

17. The method of claim 16 wherein the brake caliper housing includes a second upper surface that is disposed opposite the lower surface, the second upper surface being disposed at an acute angle with respect to the second boss surface.

18. The method of claim 17 wherein the actuator snout is disposed between the first upper surface and the second upper surface.

19. The method of claim 1 wherein at least one of the first die and the second die is moveable along an axis that is disposed perpendicular to the mating plane.

20. The method of claim 19 wherein the brake caliper housing has a top surface that faces away from a cavity and a bottom surface that is disposed opposite the top surface and faces away from the cavity, and wherein the top surface and the bottom surface are disposed in a nonparallel and non-perpendicular relationship with the mating plane and the axis.

* * * * *